United States Patent [19]
Debaigt

[11] 3,891,295
[45] June 24, 1975

[54] FIXING DEVICE FOR A SUPPORT MEANS

[75] Inventor: Jean Debaigt, Maisons-Laffitte, France

[73] Assignee: C.G.E.E.-Alsthom, Levallois-Perret, France

[22] Filed: Oct. 25, 1973

[21] Appl. No.: 409,669

Related U.S. Application Data

[63] Continuation of Ser. No. 243,962, April 14, 1972, abandoned.

[30] Foreign Application Priority Data

Apr. 15, 1971   France .............................. 71.13295

[52] U.S. Cl. ........................................ 339/198 GA
[51] Int. Cl. ............................................ H01r 9/00
[58] Field of Search .................................... 339/198

[56] References Cited
UNITED STATES PATENTS 3,277,427   10/1966   Jurca ............................ 339/198 GA

FOREIGN PATENTS OR APPLICATIONS 4,311,066   6/1965   Japan .............................. 339/198 G
1,085,938   7/1960   Germany ....................... 339/198 GA
  563,554   6/1957   Italy ................................ 339/198 G Primary Examiner—Marion Parsons, Jr.
Assistant Examiner—Robert A. Hafer
Attorney, Agent, or Firm—Edwin E. Greigg

[57] ABSTRACT

Fixing device for a support element between the opposite wings of a profiled connection block consisting in making a part of this fixing device removable, so as to provide easier installing, in a single operation, of a block formed by several support elements arranged side by side, between the wings of the connection block.

2 Claims, 3 Drawing Figures

3,891,295

FIXING DEVICE FOR A SUPPORT MEANS

This is a continuation of application Ser. No. 243,962 filed Apr. 14, 1972, now abandoned.

The invention concerns the fixing, between the opposite wings of a profiled terminal strip, of a support element, such as a plate supporting electrical connection terminals.

A known fixing device which is very simple consists of a first rigid protuberance arranged at the base of the support element limiting a notch which is intended to cooperate with a first wing of a profiled terminal strip, and a second flexible protuberance which has shape of a substantially vertical tab connected by its lower end to the base of the support element and which is intended to cooperate with a second wing of the terminal strip. When the support element is installed on the terminal strip, the notch is arranged astride the first wing of the terminal strip, the second flexible protuberance gives way to the second wing, then substantially returns to its former position, the end of the tab resting against the edge of that second wing.

In certain applications, for example, when the support elements are terminal plates intended to be arranged side by side on a profiled terminal strip, it appeared interesting, for easy assembling, to assemble the support elements in the form of a block, before fixing them on the terminal strip. But as each element comprises its own fixing device, the greater the number of elements comprised in a block, the more it becomes difficult to position it on the terminal strip.

The invention aims at overcoming that disadvantage while retaining the general characteristics and the low manufacturing cost of the preceding fixing device.

According to the invention, a fixing device for a support element comprises a first rigid protuberance cooperating with a first wing of the terminal strip, and a second flexible protuberance having the shape of a substantially vertical tab connected by its lower end to the support element and cooperating with a second wing of the terminal strip. It is characterized more particularly in that the said second flexible protuberance can be separated from the support element.

According to another characteristic of the invention, the said second protuberance is mounted on a base which fits into the base of the support element.

According to another characteristic of the invention, the base is held fitted in the support element by a spring catch system.

Other characteristics and advantages of the invention will become apparent from the following description of an embodiment given by way of a non-limiting example. This description is given with reference to the drawing, wherein.

Figure 1:
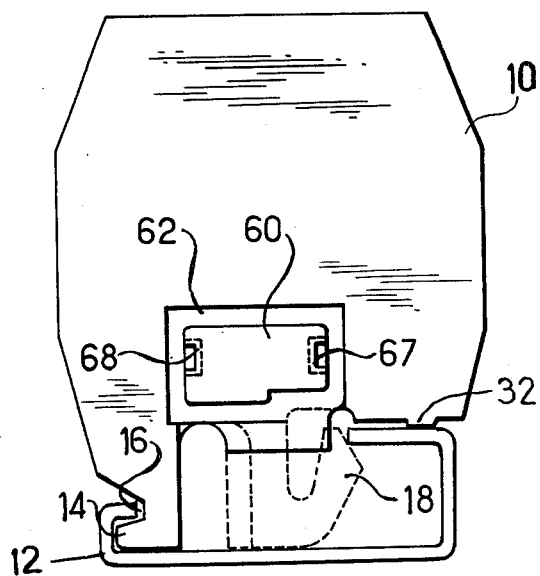
FIG. 1 is a side view of the insulating support element of a terminal plate provided with a fixing device according to the invention.
Figure 2:
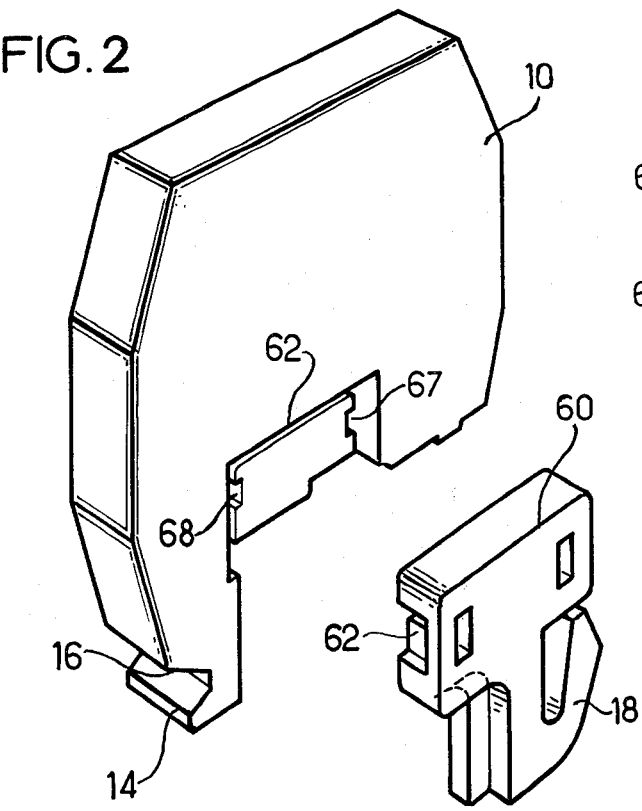
FIG. 2 is a perspective view of the same support element and of its fixing device, in which the second flexible protuberance is shown detached from the support element.

In FIGS. 1 and 2, 10 is the insulating support element of a terminal plate, it being understood that a plurality of elements 10 are arranged side by side. This element is not shown in detail, for only the fixing device situated at its base forms a part of the invention. This fixing device comprises a first rigid protuberance 14 arranged on a side of the support element 10, and provided with a slot 16, and a second flexible protuberance 18. This second flexible protuberance 18 has the shape of a substantially vertical tab connected by its lower end to the base of the support element. The installing of the support element on a terminal strip is effected in a very simple way. Firstly, the slot 16 is placed astride a wing of the terminal strip 12. Then, the support element is tipped towards the opposite wing. During this tipping movement, the second flexible protuberance 18 gives way to the rim of that wing and substantially resumes its former position, whereas the stop 32 rests against the edge of the wing of the terminal strip.

The rigid protuberance 14 is fast with the support element 10. It is, to great advantage, made in a single piece with the latter. On the other hand, the elastic protuberance 18 is detachable. It is mounted on a base 60 which fits into the base of the support element 10.

The fitting of the base 60 into the base of the support element 10 is effected by moving one in relation to the other, this being effected in a plane perpendicular to the deformation plane of the flexible protuberance 18. In the embodiment shown, the base 60 fits laterally into a side of the support element 10 by linear movement perpendicular to that side, for the deformation plane of the flexible protuberance 18 is parallel to the sides of the terminal plate.

Figure 3:
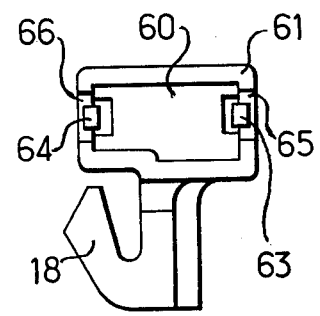
FIG. 3 is a side view of the second flexible protuberance showing more particularly the spring catch device.

The shapes of the base 60 and of the base of the support element 10, which fit into each other are such that the said base 60, when fitted in position, cannot effect any movement in relation to the support element 10, in the deformation plane of the flexible protuberance 18. As may be seen in FIGS. 2 and 3, the base 60 comprises, on one of its lateral faces, a rib 61 which follows a substantially rectangular contour and which is fitted into a groove 62 following a similar contour cut in a lateral face of the support element 10 at the base of the latter.

The base 60 is held fitted in the support element 10 by a spring catch system. The latter comprises, on the one hand, on the base 60, two protuberances supported by two flexible tongues 63 and 64, visible on FIG. 3, which are accommodated in two cavities 65 and 66 formed in the rib 61, and, on the other hand, on the support element 10, two cavities 67 and 68 formed in the side of the groove 62.

The use of such a fixing device is a particular advantage for the terminal plates which can be assembled in the form of a block before being fixed onto a terminal strip. Indeed, for the positioning of the block on the terminal strip, it is sufficient to complete the fixing device of a support element from time to time by fitting a base 60 supporting a flexible protuberance 18 into the base of that element. The bases of all the support elements have an identical shape, this simplifying production. The same applied to the parts formed by the base 60 and the flexible protuberance 18 which are, to great advantage, made of the same material as the support element 10.

Of course, this description has been given only by way of an example, and it is possible to modify certain arrangements without going beyond the scope of the invention.

That which is claimed is:

1. A terminal block assembly comprising, in combination: a channel-shaped metallic mounting bar having first and second opposed flanges; a plurality of stacked insulative support elements, arranged side by side, each having a base and upstanding first and second side and first and second end walls and an integral rigid projection depending beneath said first side wall, and a slot between said first side wall and said projection about each of which respective one of said insulative support elements have been rotated into assembly with said first flange of said mounting bar; a plurality of separate, removable, insulative bases assembled respectively with respective ones of said support elements and each base further including a flexible arm portion extending towards respective ones of said second side walls and diametric to associated ones of said slots, each said arm portion including a camming surface adapted to lock each respective said arm portion in engagement with said second flange of said mounting bar, wherein said plurality of stacked insulative support elements exceed numerically said plurality of insulative bases, some of said insulative support elements being free of insulative bases so as not to increase undesirably force required to engage fixedly said insulative support elements to said mounting bar whereby the plurality of stacked insulative support elements may be arranged in the form of a multiple block before being fixed onto the metallic mounting bar, each said support element including a recess in each said first end wall, wherein each of said bases is arranged to be inserted into said recess provided in respective ones of said first end walls, wherein each of said bases further includes interlocking means formed complementally to means provided in at least some of said recesses of each of said insulative support elements, and wherein said interlocking means comprises diametrically placed flexible latching tongues on each said base which engage complementary slots in walls of at least some of said recesses.

2. A terminal block assembly as claimed in claim 1, wherein each of said bases is assembled into rigid interlocking engagement with some of said insulative support elements, the remainder of said support elements being free of any ones of said insulative bases.

* * * * *